US011512785B2

(12) United States Patent
Cheng et al.

(10) Patent No.: US 11,512,785 B2
(45) Date of Patent: Nov. 29, 2022

(54) ELECTRICALLY OPERATED VALVE

(71) Applicant: Zhejiang Sanhua Automotive Components Co., Ltd., Hangzhou (CN)

(72) Inventors: Shuai Cheng, Hangzhou (CN); Ze Li, Hangzhou (CN); Hong Yuan, Hangzhou (CN); Dun Xia, Hangzhou (CN); Xiaolong Wang, Hangzhou (CN); Shuiqing Liang, Hangzhou (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 61 days.

(21) Appl. No.: 16/770,563

(22) PCT Filed: Dec. 7, 2018

(86) PCT No.: PCT/CN2018/119666
§ 371 (c)(1),
(2) Date: Jun. 5, 2020

(87) PCT Pub. No.: WO2019/114613
PCT Pub. Date: Jun. 20, 2019

(65) Prior Publication Data
US 2021/0164576 A1 Jun. 3, 2021

(30) Foreign Application Priority Data
Dec. 11, 2017 (CN) .......................... 201711307890.0

(51) Int. Cl.
*F16K 31/04* (2006.01)
*F16K 11/087* (2006.01)
(Continued)

(52) U.S. Cl.
CPC ........ *F16K 11/0873* (2013.01); *F16K 31/043* (2013.01); *F16H 1/20* (2013.01);
(Continued)

(58) Field of Classification Search
CPC .. F16K 11/0873; F16K 31/043; F16K 31/535; F16K 31/04; F16K 31/53;
(Continued)

(56) References Cited

U.S. PATENT DOCUMENTS 3,166,098 A    1/1965  Jennings
RE30,135 E    11/1979  Fitzwater et al.
(Continued)

FOREIGN PATENT DOCUMENTS

CN    2200087 Y    6/1995
CN    103133717 A    6/2013
(Continued)

OTHER PUBLICATIONS

First Office Action for Chinese Application No. 201711307890.0, dated Jul. 20, 2020.
(Continued)

*Primary Examiner* — Matthew W Jellett
*Assistant Examiner* — Christopher D Ballman
(74) *Attorney, Agent, or Firm* — Wolf, Greenfield & Sacks, P.C.

(57) ABSTRACT

An electrically operated valve capable of quickly achieving reliable switching between multiple flow paths. The electrically operated valve includes a driving mechanism, an executing mechanism and a valve body assembly, wherein the driving mechanism includes a bushing and an output shaft located in the bushing, the executing mechanism includes a valve stem connected to the output shaft and a valve core connected to the valve stem, and the valve core is provided with a first flow channel and a second flow channel; the valve body assembly includes a valve body and a valve seat, the bushing forms a space isolated from the outside, the output shaft and a connecting portion between the valve stem and the output shaft are located in this space, (Continued)

and the valve body has a cavity, four through holes and a plug port.

8 Claims, 7 Drawing Sheets

(51) Int. Cl.
  *F16H 1/20* (2006.01)
  *F16K 31/53* (2006.01)
  *F16H 1/28* (2006.01)
  *F16H 3/44* (2006.01)
(52) U.S. Cl.
  CPC .............. *F16H 1/28* (2013.01); *F16H 3/44* (2013.01); *F16K 11/087* (2013.01); *F16K 31/04* (2013.01); *F16K 31/53* (2013.01); *F16K 31/535* (2013.01)
(58) Field of Classification Search
  CPC . F16K 11/087; F16H 1/28; F16H 1/20; F16H 3/44
  See application file for complete search history.

(56) References Cited

U.S. PATENT DOCUMENTS

| | | | | |
|---|---|---|---|---|
| 4,635,674 | A * | 1/1987 | Bajka | F16K 5/225 |
| | | | | 137/246.22 |
| 5,135,026 | A | 8/1992 | Manska | |
| 5,529,758 | A * | 6/1996 | Houston | F16K 11/0853 |
| | | | | 137/312 |
| 6,000,430 | A * | 12/1999 | Nafz | F16K 11/0876 |
| | | | | 137/597 |
| 6,698,452 | B2 * | 3/2004 | Sisk | F25B 41/26 |
| | | | | 137/625.43 |
| 8,800,667 | B2 * | 8/2014 | Seim | E21B 33/035 |
| | | | | 166/373 |
| 9,686,907 | B2 * | 6/2017 | Hui | A01C 7/20 |
| 9,803,760 | B2 * | 10/2017 | Morein | F16K 27/065 |
| 2007/0068584 | A1 | 3/2007 | Murdock et al. | |
| 2008/0295751 | A1 * | 12/2008 | Shoup | A01C 7/081 |
| | | | | 111/174 |
| 2011/0011474 | A1 * | 1/2011 | Duncan | A61M 39/223 |
| | | | | 137/625.47 |
| 2012/0172171 | A1 | 7/2012 | Byun | |
| 2014/0261808 | A1 | 9/2014 | Brouwer et al. | |
| 2014/0346380 | A1 * | 11/2014 | Bourqui | F16K 31/041 |
| | | | | 251/129.11 |
| 2015/0308583 | A1 * | 10/2015 | Suzuki | F02D 9/1065 |
| | | | | 74/665 A |
| 2016/0334151 | A1 * | 11/2016 | Yu | F16K 31/1635 |
| 2017/0152957 | A1 | 6/2017 | Roche et al. | |
| 2017/0246443 | A1 | 8/2017 | Törnblom | |

FOREIGN PATENT DOCUMENTS

| | | |
|---|---|---|
| CN | 104048087 A | 9/2014 |
| CN | 204573194 U | 8/2015 |
| CN | 105422952 A | 3/2016 |
| CN | 205479437 U | 8/2016 |
| CN | 105972259 A | 9/2016 |
| CN | 106659879 A | 5/2017 |
| CN | 107269874 A | 10/2017 |
| FR | 1 589 878 A | 4/1970 |
| FR | 2 656 668 A1 | 7/1991 |
| JP | S60-37470 A | 2/1985 |
| JP | H01-299373 A | 12/1989 |
| JP | H08-028727 A | 2/1996 |
| JP | 2000-179716 A | 6/2000 |
| JP | 2002-005543 A | 1/2002 |
| WO | WO 2009/019846 A1 | 2/2009 |

OTHER PUBLICATIONS

International Search Report and Written Opinion for International Application No. PCT/CN2018/119666, dated Mar. 1, 2019.
Extended European Search Report for European Application No. 18888358.1, dated Sep. 3, 2021.
Office Action for Japanese Application No. 2020-549856, dated Jul. 5, 2021.

* cited by examiner

ELECTRICALLY OPERATED VALVE

The present application is the national phase of international application No. PCT/CN2018/119666, titled "ELECTRICALLY OPERATED VALVE", filed on Dec. 7, 2018, which claims the priority to Chinese patent application No. 201711307890.0, titled "ELECTRIC VALVE", filed with the China National Intellectual Property Administration on Dec. 11, 2017. The contents of these applications are incorporated herein by reference in their entirety.

FIELD

The present application relates to the technical field of fluid control, and in particular to an electric valve.

BACKGROUND

In some systems with multiple flow paths, such as an air conditioning system for a vehicle, multiple solenoid valves are generally used to switch the flow paths. On the one hand, the arrangement of the multiple solenoid valves increases the difficulty of assembly, is not convenient for inspection and maintenance, and has a high cost; and on the other hand, multiple solenoid valves need to coordinate at the same time to switch the flow paths, and each solenoid valve switches in an orderly manner, which increases the difficulty and complexity of the flow path switching.

Therefore, a technical problem to be urgently solved by those skilled in the art is how to use fewer valves to realize the switching of multiple flow paths under complicated working conditions.

SUMMARY

An object of the present application is to provide an electric valve capable of achieving the switching of multiple flow paths.

In order to achieve the above object, an electric valve is provided according to the present application, which includes a driving mechanism, an executing mechanism and a valve body assembly. The driving mechanism includes a sleeve and an output shaft, and the output shaft is located inside the sleeve. The executing mechanism includes a valve stem connected to the output shaft and a valve core connected to the valve stem, and the valve core is provided with a first flow channel and a second flow channel. The valve body assembly includes a valve body. The driving mechanism is hermetically fixed to the valve body assembly, and a space isolated from the outside is formed after the driving mechanism is sealed to the valve body assembly. The output shaft and a connecting portion between the valve stem and the output shaft are located in the space. The valve body has a cavity, four through holes and a plugging hole. A connecting portion between the valve stem and the valve core is located in the cavity, and the valve stem is not connected with the outside. The through holes and the plugging hole are peripherally distributed at intervals, and the plugging hole is provided between adjacent through holes. The valve body assembly further includes a valve seat used for mounting the valve core, and the valve seat is provided with communication apertures in communication with the corresponding through holes.

The electric valve includes a first working position and a second working position. While the electric valve is at the first working position, the peripherally adjacent through holes are in communication in pairs by the flow channels of the valve core. While the electric valve is at the second working position, two of the through holes are in communication by one of the flow channels, and two of the through holes peripherally adjacent to the plugging hole are plugged. The valve core is provided with a plugging portion corresponding to the plugging hole in one-to-one correspondence. While the electric valve is at the first working position, the plugging portion is butted with the plugging hole; and While the electric valve is at the second working position, as for the two of the through holes peripherally adjacent to the plugging hole, one is plugged by the plugging hole, and the other one is plugged by the plugging portion.

The valve body assembly further includes a plugging cover. The valve body is provided with an opening communicating with the cavity between at least two adjacent through holes, and the plugging cover plugs the opening to form the plugging hole.

The driving mechanism includes a rotor assembly and a gear set. The rotor assembly includes a rotor and the output shaft, a first-stage gear of the gear set is connected to the output shaft, and a last stage gear of the gear set is connected to the valve stem. The gear set is also arranged in the space.

The valve body assembly further includes a gear cover arranged outside the gear set and the valve stem. The valve body has an end portion opening in communication with the cavity, one end of the valve stem extends into the cavity through the end portion opening and is connected with the valve core, and one end of the gear cover is hermetically connected with the open end of the valve body.

The rotor assembly further includes a connecting seat hermetically connected to an open end of the sleeve. The output shaft passes through the connecting seat, and the sleeve is fixedly and hermetically connected with another end of the gear cover through the connecting seat.

In a case that the gear set is a planetary gear set having gears of three or more stages, the planetary gear set is fixedly mounted in the space by cooperation between the gear cover and the valve body, and part of the valve stem is located in the space and the rest of the valve stem is located in the valve body.

In a case that the planetary gear set has gears of four stages, a central axis of the first-stage gear coincides with a central axis of the planetary gear set, the first-stage gear is externally engaged with more than two second-stage gears peripherally distributed at intervals, one axial end of each of the second-stage gears is engaged with an internal ring of a third-stage gear, the other axial end of each of the second-stage gears is engaged with an internal ring of a fourth-stage gear, and the third-stage gear is fixedly connected to the gear cover.

The gear set further includes a gear fixing seat mounted at the end portion opening. Part of the valve stem extends into the cavity and is connected with the valve core, and another part of the valve stem passes through the gear fixing seat, extends into the space, and is connected with the planetary gear set. The gear fixing seat is provided with a position-limiting post, and the fourth-stage gear is provided with a position-limiting groove cooperating with the position-limiting post which is configured to support the gear set and limit the rotation of the valve core to be within a range of switching working positions.

In a case that the gear set includes gears of more than four stages, gears of various stages subsequent to the second-stage gear are sequentially distributed in an axial direction and are engaged stage by stage. In addition to the first-stage gear, each of the gears of various stages has a transmission gear fixed in the respective peripheral direction and located in a same plane as the next stage gear, so as to engage with the next stage gear through the transmission gear. The gear set further includes the position-limiting posts and the gear fixing seat mounted at the end portion opening. The position-limiting post is used for penetrating through the gears of various stages on a same central axis and the transmission gear. One end of each position-limiting post is connected with a fixing plate, and the other end is fixedly connected with the gear fixing seat. Part of the valve stem extends into the cavity and is connected with the valve core, and another part of the valve stem passes through the gear fixing seat, extends into the space, and is connected with the planetary gear set. The last stage gear of the gear set is a sector gear. At least two position-limiting posts are respectively arranged on two sides of the sector gear, so as to limit the rotation of the valve core to be within the range of switching working positions. The gear set further includes position-limiting sleeves fitted over the position-limiting posts for limiting the axial float of the gears of various stages and the transmission gears.

The electric valve according to the present application switches the flow paths by the rotation of the valve core. Compared with the general flow path switching achieved by the combination of multiple solenoid valves, the electric valve according to the present application has a relatively compact structure and a relatively small size.

Figure 1:
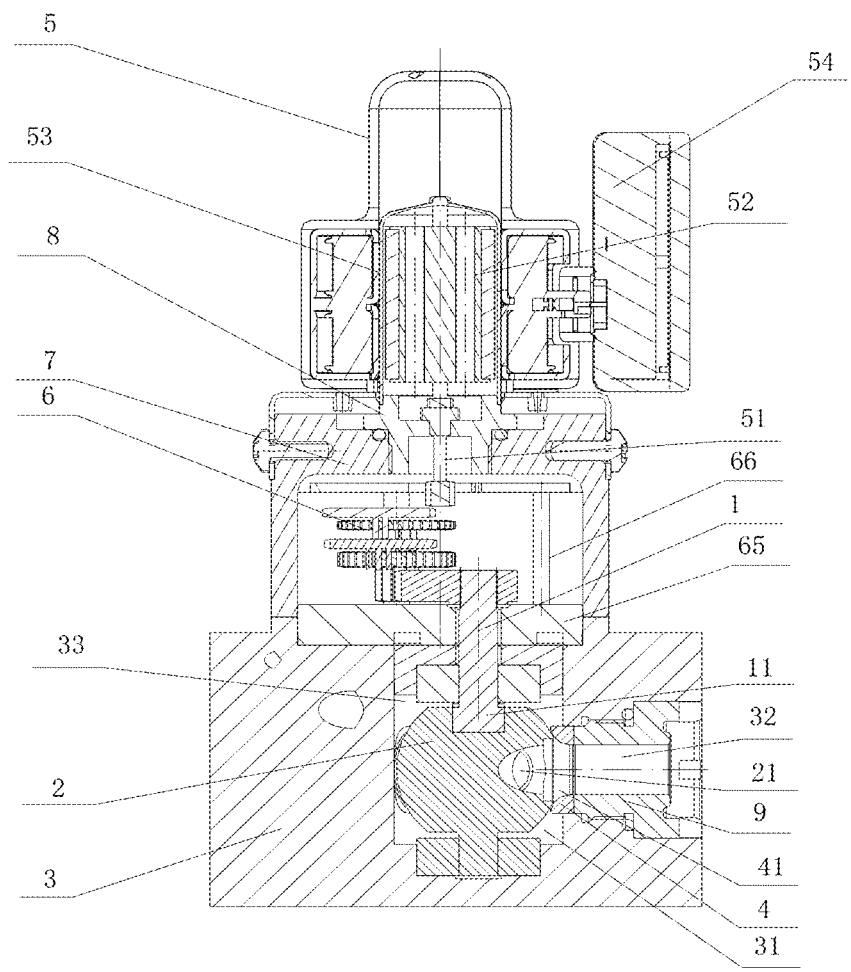
FIG. 1 is a sectional view of a specific embodiment of an electric valve according to the present application.

| Reference numerals in FIGS. 1 to 12: | |
|---|---|
| 1 valve stem, | 11 inserting end, |
| 2 valve core, | 21 first flow channel, |
| 22 inserting groove, | 23 plugging portion, |
| 24 second flow channel, | 3 valve body, |
| 31 cavity, | 32 through hole, |
| 33 end portion opening, | 34 plugging hole, |
| 4 valve seat, | 41 communication aperture, |
| 5 rotor assembly, | 51 output shaft, |
| 52 rotor, | 53 sleeve, |
| 54 coil assembly, | 6 gear set, |
| 61 first-stage gear, | 62 second-stage gear, |

| Reference numerals in FIGS. 1 to 12: | |
|---|---|
| 63 third-stage gear, | 64 fourth-stage gear, |
| 65 gear fixing seat, | 66 position-limiting post, |
| 67 position-limiting groove, | 68 transmission gear, |
| 69 fixing plate, | 60 position-limiting sleeve, |
| 600 connecting plate, | 611 fifth-stage gear, |
| 612 sixth-stage gear, | 613 seventh-stage gear, |
| 7 gear cover, | 8 connecting seat, |
| 9 end cover, | 10 plugging cover. |

DETAILED DESCRIPTION OF THE EMBODIMENTS

The embodiments of the present application will be illustrated in detail in conjunction with accompanying drawings herein after, so that those skilled in the art can accurately understand the technical solution of the present application.

The axial, peripheral, and radial directions are all described with an electric valve as the reference. An extension direction of a central axis of the electric valve is defined as the axial direction, a rotation direction of a rotor in a rotor assembly 5 of the electric valve is defined as the peripheral direction, and in a horizontal plane perpendicular to the axial direction, a diametral extension direction of the rotor is defined as the radial direction.

Terms such as "first", "second" and the like in the present application are only intended to distinguish two or more components or configurations having the same or similar structures, rather than to imply a particular sequence.

As shown in FIGS. 1 to 12, an electric valve is provided according to the present application, which includes a driving mechanism, an executing mechanism and a valve body assembly. The driving mechanism is configured to drive the executing mechanism to switch flow paths of the valve body assembly. Specifically, the driving mechanism includes a sleeve 53 and an output shaft 51. The output shaft 51 is located in the sleeve 53. The executing mechanism includes a valve stem 1 and a valve core 2 which are connected with each other. The valve stem 1 is connected with the output shaft 51 and rotates under the drive of the output shaft 51, and further drives the valve core 2 to rotate. The valve core 2 is provided with a first flow channel 21 and a second flow channel 23. The sleeve 53 is hermetically fixed to the valve body assembly, and a space isolated from the outside is formed after the sleeve 53 is sealed to the valve body assembly. The output shaft 51 and a connecting portion between the valve stem 1 and the output shaft 51 are located in the space, and the valve stem 1 is not connected with the outside. The valve body assembly includes a valve body 3. The valve body 3 has a cavity 31 and four through holes 32 in communication with the cavity 31. The valve body assembly further includes a valve seat 4 for mounting the valve core 2, and the valve seat 4 is provided with communication apertures 41 in communication with the corresponding through holes 32. The valve body 3 further includes at least one plugging hole 34, the through holes 32 and the at least one plugging hole 34 are distributed at intervals in a peripheral direction of the valve body 3, and two peripherally adjacent through holes 32 correspond to the first flow channel 21 or the second flow channel 24 of the valve core 2. The plugging hole 34 is arranged between two adjacent through holes 32. The plugging hole 34 may be arranged between two adjacent through holes 32 as required;

or the plugging hole 34 may be arranged between another two adjacent plugging holes 34 as required; or multiple plugging holes 34 are arranged between multiple pairs of peripherally adjacent through holes 32 at the same time, so as to plug two or more through holes 32 as required.

Figure 2:
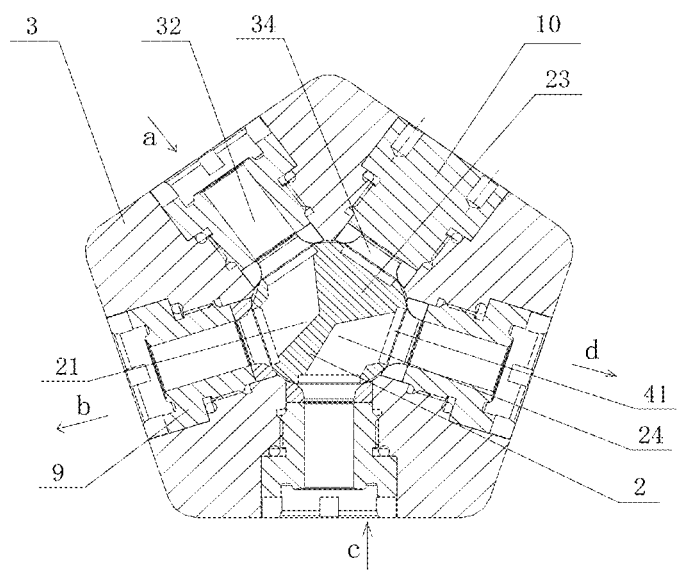
FIG. 2 is a sectional view of the electric valve shown in FIG. 1 in a communication state.
Figure 3:
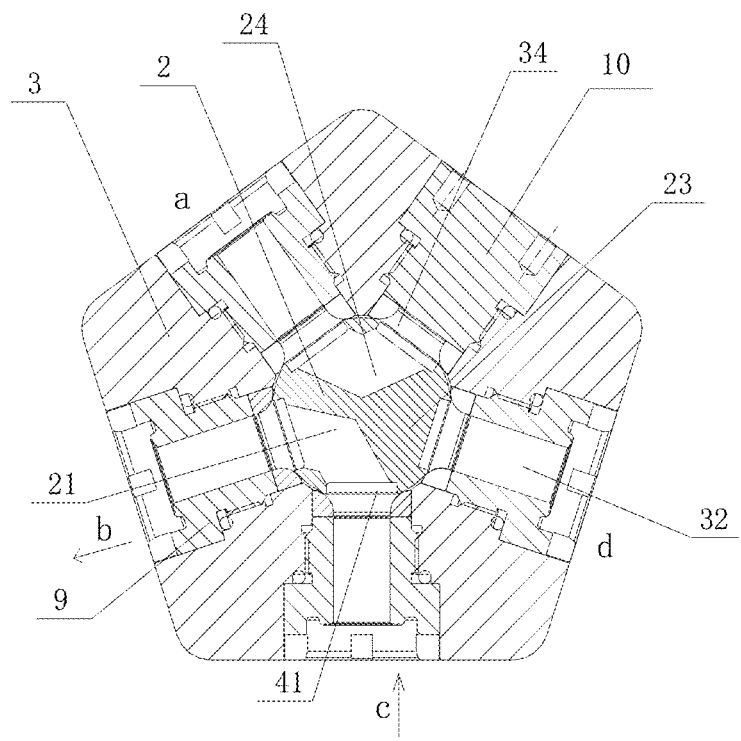
FIG. 3 is a sectional view of the electric valve shown in FIG. 1 in another communication state.

Specifically, as shown in FIGS. 1 to 3, each of the flow channels can be rotated to a position of the corresponding through hole 32 as the valve stem 1 drives the valve core 2 to rotate, so that the peripherally adjacent through holes 32 are in communication in pairs, and no through hole 32 in a plugged state, which is defined as a first working position. When it is required to switch the through holes 32 in communication with each other and plug some of the through holes 32, the valve stem 1 drives the valve core 2 to rotate by a certain angle to a second working position, so that the flow channels of the valve core 2 move forward in the rotation direction to the next pair of through holes 32 located ahead in the rotation direction, and communicate the next pair of peripherally adjacent through holes 32, and, one of two through holes 32 adjacent to the plugging hole 34 is butted with the plugging hole 34, and the other one is butted with a solid structure of the valve core 2, so that the two through holes 32 adjacent to the plugging hole 34 are placed in a plugged state. Here, the front and rear are defined with the rotation direction as the reference. The direction located ahead in the rotation direction or the direction pointed by the rotation direction is defined as front, and the direction located behind the rotation direction is defined as rear.

In order to plug the through holes 32, according to the present application, the valve core 2 is provided with a plugging portion 23 corresponding to the plugging hole 34 in one-to-one correspondence. While the electric valve is at the first working position, the peripherally adjacent through holes 32 are in communication in pairs by the first flow channel 21 and the second flow channel 24, and the plugging portion 23 is butted with the plugging hole 34, as shown in FIG. 2. While the electric valve is at the second working position, the valve core 2 is rotated to a position where the next pair of peripherally adjacent through hole 32 is in communication with each other, and one of the two through holes 32 peripherally adjacent to the plugging hole 34 is butted with the plugging hole 34 through the first flow channel 21 or the second flow channel 24, and since the plugging hole 34 is in the plugged state, this through hole 32 is plugged by the plugging hole 34; and the other one is butted with the plugging portion 23 of the valve core 2, and is plugged by the plugging portion 23, as shown in FIG. 3.

As shown in FIGS. 2, 3, 6, and 7, the valve body assembly further includes a plugging cover 10. The valve body 3 is provided with an opening communicating with the cavity 31 between at least two adjacent through holes 32, and the plugging cover 10 plugs the opening to form the plugging hole 34.

Moreover, end covers 9 may be arranged at the through holes 32 of the valve body 3, and each of the end covers 9 may be a structure with two open ends. Specifically, each of the end covers 9 may include a large-diameter portion and a small-diameter portion, the large-diameter may be provided with an external thread and be connected with the thread on an inner wall of the corresponding through hole 32, and the small-diameter portion may be hermetically connected with the valve body 3 by a sealing member such as an O-ring. An outer end of the end cover 9 is configured to connect with components such as a connecting pipe, and an inner end thereof is hermetically connected with the valve core 2 via the valve seat 4. The inner and outer herein are defined with the cavity 31 as the reference, a direction close to the cavity 31 is defined as inner, and a direction away from the cavity 31 is defined as outer.

The end cover 9 and the plugging cover 10 may have substantially same structures, and both may include the large-diameter portion and the small-diameter portion. The difference lies in that, the end cover 9 needs to be provided with a penetrating hole, so that the corresponding through hole 32 is in a communicable state.

For ease of processing, the plugging hole 34 may have a structure similar to the through hole 32; or multiple openings may be provided at intervals in the valve body 3 in the peripheral direction, one or some of the openings is plugged by the plugging cover 10 to form the plugging hole 34, and the rest openings are in a free state and form the through holes 32.

In the present embodiment, an electric valve provided with four through holes 32 and one plugging hole 34 is taken as an example for description. Correspondingly, the valve body 1 may be in a substantially regular pentagon shape from an overlook view, and the through hole 32 or the plugging hole 34 is arranged on each side of the valve body 1. In this case, the valve core 2 may be substantially Y-shaped, the first flow channel 21 and the second flow channel 24 are formed on two sides of the Y-shaped structure, and a portion between two branches of the Y-shaped structure is provided as a solid structure to form the plugging portion 23.

As shown in FIGS. 2 to 5, an electric valve having a valve core 2 provided with two relatively independent flow channels is taken as an example for description. In this case, the valve body 3 is provided with four through holes 32 peripherally distributed at intervals, and one plugging hole 34 is arranged between two of the peripherally adjacent through holes 32. While in a first communication state (corresponding to the first working position), two of the peripherally adjacent through holes 32 are in communication with each other by the first flow channel 21 of the valve core 2, and other two peripherally adjacent through holes 32 are in communication with each other by the second flow channel 24 of the valve core 2, that is, the peripherally adjacent through holes 32 are in communication in pairs by the two flow channels of the valve core 2. When the valve stem 1 drives the valve core 2 to rotate to a second communication state (corresponding to the second working position), the two through holes 32 in communication with each other are switched, that is, the peripherally adjacent through holes 32, which are not in communication with each other in the first communication state, are in communication with each other by the two flow channels 21 of the valve core 2, and the two through holes 32 adjacent to the plugging hole 34 are plugged.

For ease of description, the through holes 32 arranged in the valve body 3 are sequentially defined as a first through hole a, a second through hole b, a third through hole c and a fourth through hole d in the peripheral direction. The plugging hole 34 may be arranged between the fourth through hole d and the first through hole a. In a case that the electric valve is at the first working position, the first through hole a is in communication with the second through hole b by the first flow channel 21 of the valve core 2, and the third through hole c is in communication with the fourth through hole d by the second flow channel 24, as shown in FIG. 2. In a case that the electric valve is at the second working position, the two flow channels of the valve core 2 are rotated by a certain angle in the peripheral direction, so that the second through hole b is in communication with the third through hole c by the first flow channel 21; two ends of the second flow channel 24 are connected to the first through hole a and the plugging hole 34 respectively, so that the first through hole a is in the plugged state; and the plugging portion 23 of the valve core 2 plugs the fourth through hole d, and the fourth through hole d is in the plugged state, as shown in FIG. 3.

As shown in FIGS. 2 and 3, according to the use needs, those skilled in the art may use the two through holes 32 in communication with each other as an inlet and an outlet respectively, to achieve the transportation of gas, liquid or a gas-liquid two-phase substance. In the present embodiment, the first through hole a and the third through hole c may serve as the inlet, and the second through hole b and the fourth through hole d may serve as the outlet. In FIGS. 2 and 3, the direction of arrows indicates the flow direction.

Figure 4:
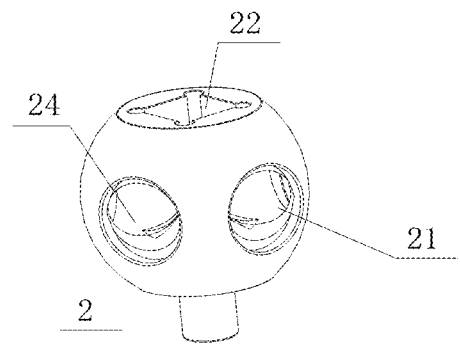
FIG. 4 is a first schematic perspective view of a valve core of the electric valve shown in FIG. 1.
Figure 5:
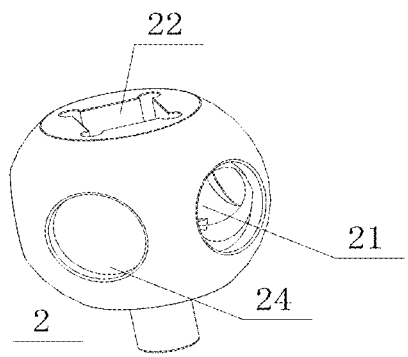
FIG. 5 is a second schematic perspective view of the valve core of the electric valve shown in FIG. 1.

As shown in FIGS. 4 and 5, two ends of each flow channel of the valve core 2 have ports, and the ports at the two ends can correspond to the through holes 32 of the valve body 3. To avoid leakage, the first flow channel 21 and the second flow channel 24 can be hermetically connected to the valve seat 4 by the ports thereof, and a sealing member such as a sealing ring may be arranged at a butting portion of the valve seat 4 and the through hole 32.

Figure 11:
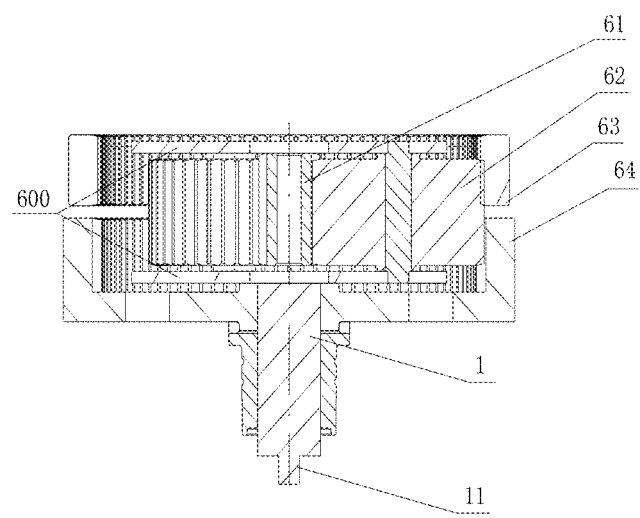
FIG. 11 is a sectional view of the gear set of the electric valve shown in FIG. 1 in an arrangement.

In addition, an inserting groove 22 may be arranged at a position of the valve core 2 corresponding to the valve stem 1. Specifically, the inserting groove 22 may be a square groove, and a notch extending outward may be provided at each vertex of the square groove to improve the positioning reliability of the connection between the valve stem 1 and the valve core 2 in the peripheral direction. The square groove may extend along the axial direction to a certain depth, and an inserting end 11 of the valve stem 1 is arranged as a column matching the square groove, so that the inserting end 11 of the valve stem 1 is inserted into the inserting groove 22 of the valve core 2, achieving the fixed connection between the valve stem 1 and the valve core 2 in the peripheral direction, as shown in FIGS. 4,5 and 11.

As shown in FIG. 1, the driving mechanism includes a rotor assembly 5 and a gear set 6, the rotor assembly 5 includes a rotor 52 and the output shaft 51, a first-stage gear 61 of the gear set 6 is connected to the output shaft 51 of the rotor assembly 5, and a last stage gear of the gear set 6 is connected to the valve stem 1. The gear set 6 provides a reduction ratio, and the rotor assembly 5 transmits the motive power to the valve stem 1 via the gear set 6 to drive the valve stem 1 to rotate. The gear set 6 is arranged in the space.

Figure 6:
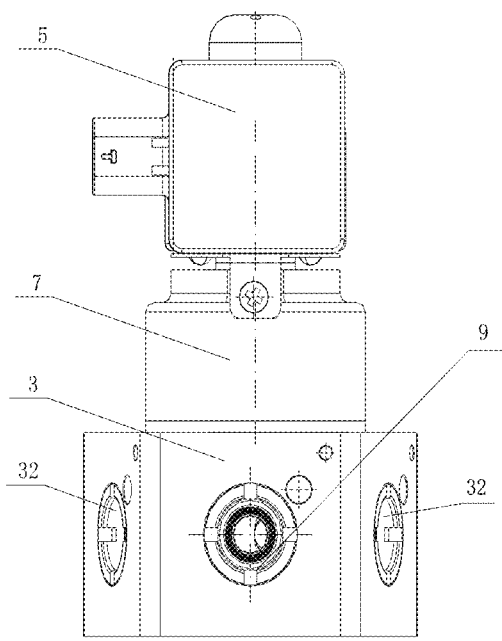
FIG. 6 is a schematic side view of the electric valve shown in FIG. 1.
Figure 7:
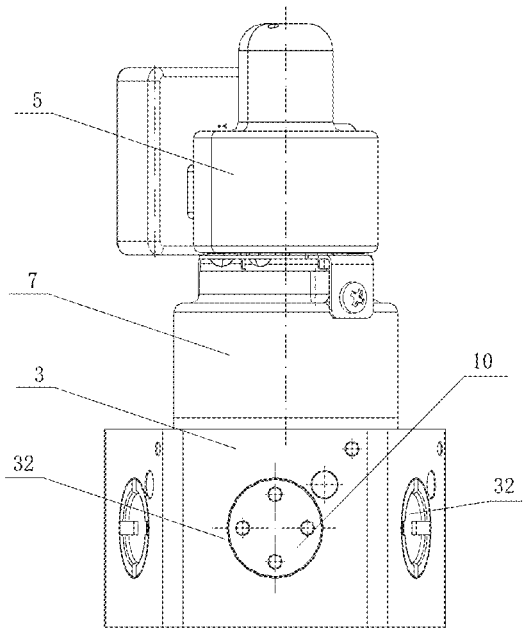
FIG. 7 is a schematic front view of the electric valve shown in FIG. 1.

Specifically, referring to FIGS. 1, 6 and 7, the valve body assembly further includes a gear cover 7 fitted over the gear set 6 and the valve stem 1, the valve body 3 has an end portion opening 33 in communication with the cavity 31, one end of the valve stem 1 is connected with the valve core 2 arranged in the cavity 31 through the end portion opening 33, one end of the gear cover 7 is hermetically connected with the open end of the valve body 3, and another end of the gear cover 7 is hermetically connected with the sleeve 53.

As shown in FIGS. 6 and 7, one end of the gear cover 7 in the axial direction is hermetically connected with the open end of the valve body 3. With such an arrangement, one end of the valve stem 1 can extend into the end portion opening 33, and the valve core 2 can also be arranged in the cavity 31 through the end portion opening 33, so that the valve body 3 may have an integral structure, and the mounting of the valve core 2 can be completed without separately arranging the valve body 3.

Specifically, the rotor assembly 5 may include the output shaft 51, the rotor 52, the sleeve 53 and a coil assembly 54 which are sequentially provided from inside to outside. The output shaft 51 and the rotor 52 are arranged inside the sleeve 53, and the coil assembly 54 is fitted over the sleeve 53. The sleeve 53 and the coil assembly 54 are mounted to one end of the gear cover 7, and the sleeve 53 is hermetically connected with the gear cover 7 as shown in FIG. 1.

The inner and outer herein are defined with a central axis of the output shaft 51 of the rotor assembly 5 as the reference, a direction close to the central axis is defined as inner, and a direction away from the central axis is defined as outer.

With the above structure, the rotor 52 can be protected by the sleeve 53, and can be hermetically connected with the gear cover 7, improving the sealing reliability of the entire electric valve.

In order to achieve the connection between the sleeve 53 and the gear cover 7, according to the present application, the rotor assembly 5 may further include a connecting seat 8 hermetically connected to an open end of the sleeve 53. The output shaft 51 of the rotor assembly 5 passes through the connecting seat 8, and the sleeve 53 is fixedly and hermetically connected with another end of the gear cover 7 through the connecting seat 8, as shown in FIG. 1.

In the present embodiment, the connecting seat 8 may be hermetically connected with the open end of the sleeve 53 by means of welding such as vacuum electron beam welding. The connecting seat 8 may be hermetically connected with the gear cover 7 by providing a sealing member such as an O-ring. The gear cover 7 may be hermetically connected with the open end of the valve body 3 by means of welding such as vacuum electron beam welding.

In the present embodiment, the rotor assembly 5 may use a stepper motor or a direct current brushless motor as the power source. The stepper motor or the direct current brushless motor may be arranged similar to the above described. The difference lies in that, specific parameters of the stepper motor and the direct current brushless motor can be set as required. For example, the number of stages of magnetization may be different, the number of stages of the stepper motor may be six, and the number of stages of the direct current brushless motor may be four. Besides, the stepper motor and the direct current brushless motor are also different in the coil winding method and the form of the stator, which can be specifically arranged as required by those skilled in the art and does not affect the arrangement of the motor according to the general structure of the present application.

On the basis of the above, according to the present application, the gear set 6 may be selected to obtain the desired transmission ratio. For example, a planetary gear set or an ordinary gear set 6 may be selected.

As shown in FIGS. 8 to 11, in the present embodiment, the gear set 6 may be a planetary gear set having gears of more than three stages. The planetary gear set is fixedly mounted in the space by cooperation between the gear cover 7 and the valve body 3, and part of the valve stem 1 is located in the space and the rest of the valve stem 1 is located in the valve body 3.

In the present embodiment, a gear set having gears of four stages is taken as an example for description, that is, the planetary gear set has gears of four stages, which can be defined as a first-stage gear 61, a second-stage gear 62, a third-stage gear 63 and a fourth-stage gear 64 according to the transmission stage. A central axis of the first-stage gear 61 coincides with that of the planetary gear set, that is, the first-stage gear 61 is located in the middle. The second-stage gear 62 is engaged with the outer circumference of the first-stage gear 61. The third-stage gear 63 and the fourth-stage gear 64 are both provided with teeth on internal rings, and the teeth on the internal rings are engaged with external teeth of the second-stage gear 62. The first-stage gear 61, the second-stage gear 62 and the third-stage gear 63 are sequentially arranged in the radial direction from the inside to the outside; and, the first-stage gear 61, the second-stage gear 62 and the fourth-stage gear 64 are also sequentially arranged in the radial direction from the inside to the outside.

More specifically, the first-stage gear 61 is externally engaged with more than two second-stage gears 62 peripherally distributed at intervals, one axial end of each of the second-stage gears 62 is engaged with the internal ring of the third-stage gear 63, the other axial end of each of the second-stage gears 62 is engaged with the internal ring of the fourth-stage gear 64, and the third-stage gear 63 is fixedly connected to the gear cover 7 to prevent the second-stage gears 62 from idling, thereby providing a transmission ratio for the fourth-stage gear 64 and enabling the fourth-stage gear 64 to transmit the motive power to the valve stem 1.

Figure 8:
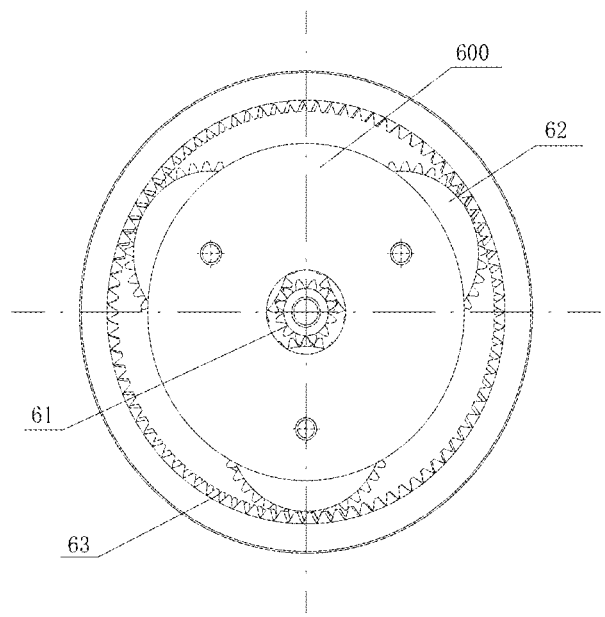
FIG. 8 is a top view of a gear set of the electric valve shown in FIG. 1 in an arrangement.

In the present embodiment, three second-stage gears 62 are provided, the three second-stage gears 62 are peripherally distributed at equal intervals, as shown in FIG. 8.

Referring to FIGS. 8 and 11, the gear set 6 may further be provided with a connecting plate 600 for connecting the three second-stage gears 62. One end of the central axis of each of the three second-stage gears 62 is rotatably connected with the connecting plate 600 in the peripheral direction, and is fixedly connected with the connecting plate 600 in the axial direction; and the other end is rotatably connected with another connecting plate 600 in the peripheral direction, and is fixedly connected with another connecting plate 600 in the axial direction, thereby achieving the connection of the three second-stage gears 62. It will be appreciated that, the arrangement of the connecting plates 600 should avoid affecting the transmission between the second-stage gears 62 and the third-stage gear 63 and the transmission between the second-stage gears 62 and the fourth-stage gear 64.

Moreover, the gear set 6 may further include a gear fixing seat 65 mounted at the end portion opening 33 of the valve body 3. Part of the valve stem 1 extends into the cavity 31 and is connected with the valve core 2, and another part of the valve stem 1 passes through the gear fixing seat 65, extends into the space, and is connected with the planetary gear set. The gear fixing seat 65 is provided with position-limiting posts 66, and the fourth-stage gear 64 is provided with position-limiting grooves 67 cooperating with the position-limiting posts 66 which are configured to support the gear set 6. The position-limiting posts 66 are fixed. While the fourth-stage gear 64 rotates, the position-limiting grooves 67 of the fourth-stage gear 64 are driven to rotate. A situation in which one end of each of the position-limiting grooves 67 comes into the corresponding position-limiting post 66 is defined as a state, and another situation in which the other end of each of the position-limiting grooves 67 comes into the corresponding position-limiting post 66 is defined as another state, so that the valve core 2 stays in a certain communication position or a communication state.

It will be appreciated that, the valve core 2 can be position-limited through the cooperation between the position-limiting grooves 67 and the position-limiting posts 66, and the rotation of the valve core 2 is limited to be within a range of switching working positions, so that the valve core 2 can only be rotated within the range of switching working positions. Specifically, in the present embodiment, the valve core 2 has two working positions. The first communication state corresponds to the first working position, and the second communication state corresponds to the second working position, so the valve 2 can only rotate to complete the switch from the first communication state to the second communication state, or the switch from the second communication state to the first communication state.

In other words, in the first communication state, the fourth-stage gear 64 moves to an extreme position, and in the second communication state, the fourth-stage gear 64 moves to another extreme position. The valve core 2 can be stabilized in the first communication state or the second communication state through the position-limiting at the extreme positions, so as to improve the stability of the valve body 3 and the reliability of the switching, and avoid unreliable communication.

Figure 9:
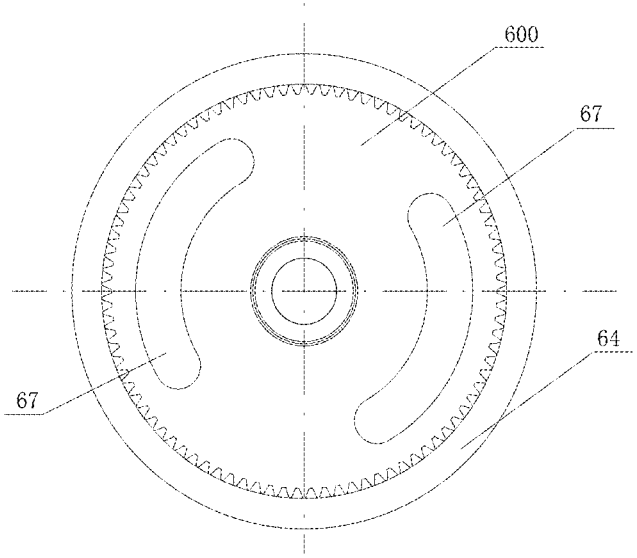
FIG. 9 is a bottom view of the gear set of the electric valve shown in FIG. 1 in an arrangement.
Figure 10:
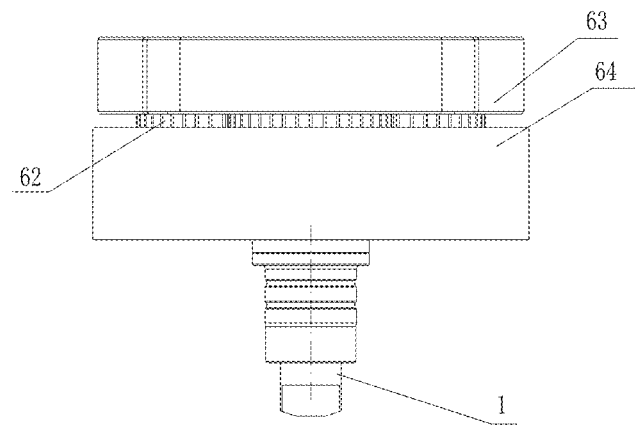
FIG. 10 is a schematic front view of the gear set of the electric valve shown in FIG. 1 in an arrangement.

As shown in FIGS. 1 and 9, specifically, the position-limiting groove 67 may be arranged on one face of the fourth-stage gear 64 facing the end portion opening 33 of the valve body 3. The position-limiting groove 67 may be an arc groove. Two or more position-limiting grooves 67 peripherally distributed at intervals may be provided as required, and position-limiting posts 66 cooperating with the position-limiting grooves 67 are correspondingly arranged.

Figure 12:
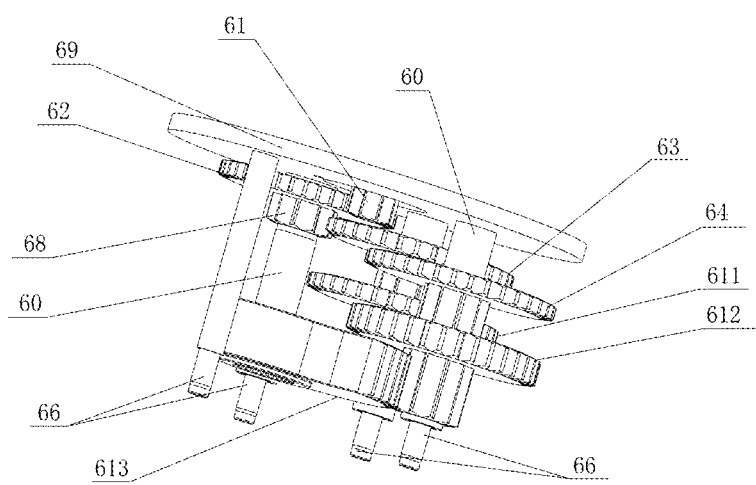
FIG. 12 is a schematic perspective view of the gear set of the electric valve shown in FIG. 1 in another arrangement.

As shown in FIG. 12, in another specific arrangement, the gear set 6 includes gears of more than four stages, the first-stage gear 61 and the second-stage gear 62 are in a same plane and directly externally engaged with each other for transmission, and gears of various stages subsequent to the second-stage gear are sequentially distributed in the axial direction and are engaged stage by stage. In addition to the first-stage gear 61, each of the gears of various stages has a transmission gear 68 fixed in the respective peripheral direction and located in a same plane as the next stage gear, so as to engage with the next stage gear through the transmission gear 68. In other words, only the first-stage gear 61 is directly engaged with the second-stage gear 62 in the same plane for transmission, the second-stage gear 62 is engaged with the third-stage gear 63 for transmission through the transmission gear 68 fixed in the peripheral direction, and the transmission method between the third-stage gear and the fourth-stage gear is same as that between the second-stage gear and the third-stage gear. Therefore, gears of various stages subsequent to the second-stage gear are sequentially distributed in the axial direction and are engaged stage by stage. Apparently, a transmission gear 68 peripherally fixed to the first-stage gear 61 and located below (the below herein refers to a direction towards the cavity 31 in the axial direction) the first-stage gear 61 in the axial direction may be provided as required by those skilled in the art, and the transmission gear 68 is engaged with the second-stage gear 62.

In another embodiment, the gear set 6 has axially arranged gears of multiple stages. Specifically, the gear set has gears of seven stages. The first-stage gear 61 is directly engaged with the second-stage gear 62 in the same plane, the second-stage gear 62, the third-stage gear 63, the fourth-stage gear 64, the fifth-stage gear 611, the sixth-stage gear 612 and the seventh-stage gear 613 are sequentially engaged through the transmission gears 68, and the engaging methods are all external engagement. In this case, the seventh-stage gear 613 serves as the last stage gear and is specifically provided as a sector gear, as shown in FIG. 12.

With the above arrangement of the gear set 6, on the one hand, the requirement of the transmission ratio can be met, and on the other hand, the axial height of the entire gear set 6 can be shortened as much as possible, which is beneficial to simplifying the structure and saving the mounting space.

In a case that the gear set 6 has the above described structure, the gear set 6 may further include the position-limiting posts 66 and the gear fixing seat 65 mounted at the end portion opening 33. The position-limiting posts 66 are used for penetrating through the gears of various stages on a same central axis and the transmission gears 68. One end of each position-limiting post 66 is connected with a fixing plate 69, and the other end is fixedly connected with the gear fixing seat 65. Part of the valve stem 1 extends into the cavity 31 and is connected with the valve core 2, and another part of the valve stem 1 passes through the gear fixing seat 65, extends into the space, and is connected with the planetary gear set. In this case, the fixation and the connection of the gears of various stages are achieved by the position-limiting posts 66.

Moreover, the position-limiting posts 66 can further play a role of position-limiting. Specifically, the last stage gear of the gear set 6 is a sector gear. At least two position-limiting posts 66 are respectively arranged on two sides of the sector gear, so as to limit the rotation of the valve core 2 to be within the range of switching working positions, as shown in FIG. 12.

While the sector gear moves clockwise to a working position of the valve core 2, a side face of the sector gear located ahead in the clockwise direction is in abutment with the position-limiting post 66 located ahead in the clockwise direction to restrict the sector gear from further rotating clockwise. While the sector gear moves counterclockwise to another working position of the valve core 2, a side face of the sector gear located ahead in the counterclockwise direction is in abutment with the position-limiting post 66 located ahead in the counterclockwise direction to restrict the sector gear from further rotating counterclockwise, thereby achieving position-limiting to the valve core 2.

In addition, the gear set 6 may further includes position-limiting sleeves 60 fitted over the position-limiting posts 66, which are configured to limit the axial float of the gears of various stages and the transmission gears 68, thereby improving the reliability and stability of the transmission.

According to the present application, an appropriate gear set 6 may be selected as required. In a case that the planetary gear set is adopted, the electric valve has advantages of small axial space and easy installation in small space. In a case that the gear set 6 is adopted, gears of more stages may be provided as required, thereby obtaining a larger transmission ratio and a larger transmission force. Apparently, here are the comparison results of these two gear sets 6, wherein the large and small are relatively speaking.

The electric valve according to the present application is described in detail hereinbefore. The principle and the embodiments of the present application are illustrated herein by specific examples. The above description of the examples is only intended to facilitate the understanding of the concept of the present application. It should be noted that, for the person skilled in the art, a few of improvements and modifications may be made to the present application without departing from the principle of the present application, and these modifications and improvements are also deemed to fall into the protection scope of the present application defined by the claims.

The invention claimed is:

1. An electric valve, comprising a driving mechanism, an executing mechanism, and a valve body assembly, wherein,
   the driving mechanism comprises a sleeve and an output shaft, and the output shaft is arranged in the sleeve;
   the executing mechanism comprises a valve stem connected with the output shaft and a valve core connected with the valve stem, and the valve core is provided with a first flow channel and a second flow channel; and
   the valve body assembly comprises a valve body, the driving mechanism is hermetically fixed to the valve body assembly, a space isolated from outside is formed after the driving mechanism is sealed to the valve body assembly, the output shaft and a connecting portion between the valve stem and the output shaft are located in the space, the valve body has a cavity, four through holes and a plugging hole, a connecting portion between the valve stem and the valve core is located in the cavity, the valve stem is not connected with the outside, the through holes and the plugging hole are peripherally distributed, the plugging hole is provided between adjacent through holes, the valve body assembly further comprises a valve seat configured to mount the valve core, and the valve seat is provided with communication apertures in communication with the corresponding through holes,
   the electric valve has a first working position and a second working position;
   while the electric valve is at the first working position, the peripherally adjacent through holes are in communication in pairs by the flow channels of the valve core;
   while the electric valve is at the second working position, two of the through holes are in communication by the flow channel, and two of the through holes peripherally adjacent to the plugging hole are plugged,
   the driving mechanism comprises a rotor assembly and a gear set, the rotor assembly comprises a rotor and the output shaft, a first-stage gear of the gear set is connected to the output shaft, a last stage gear of the gear set is connected to the valve stem, and the gear set is arranged in the space,
   the valve body assembly further comprises a gear cover arranged outside the gear set and the valve stem, the valve body has an end portion opening in communication with the cavity, one end of the valve stem is extended into the cavity through the end portion opening and is connected with the valve core, and one end of the gear cover is hermetically connected with an open end of the valve body,
   the gear set further comprises the position-limiting posts and the gear fixing seat mounted at the end portion opening, the position-limiting posts are configured to penetrate through the gears of various stages on a same central axis and the transmission gears; one end of each position-limiting post is connected with a fixing plate, and another end is fixedly connected with the gear fixing seat; part of the valve stem is extended into the cavity and is connected with the valve core, and another part of the valve stem is configured to pass through the gear fixing seat and extend into the space, and is connected with the planetary gear set; and
   the last stage gear of the gear set is a sector gear, at least two position-limiting posts are respectively arranged on two sides of the sector gear, so as to limit the rotation of the valve core to be within the range of switching working positions.

2. The electric valve according to the claim 1, wherein, the valve core is provided with a plugging portion corresponding to the plugging hole in one-to-one correspondence, and while the electric valve is at the first working position, the plugging portion is butted with the plugging hole; and while the electric valve is at the second working position, as for the two of the through holes peripherally adjacent to the plugging hole, one is plugged by the plugging hole, and the other one is plugged by the plugging portion.

3. The electric valve according to the claim 2, wherein, the valve body assembly further comprises a plugging cover, the valve body is provided with an opening communicating with the cavity between at least two adjacent through holes, and the plugging cover is configured to plug the opening.

4. The electric valve according to the claim 1, wherein, the rotor assembly further comprises a connecting seat hermetically connected to an open end of the sleeve, the output shaft is configured to pass through the connecting seat, and the sleeve is fixedly and hermetically connected with another end of the gear cover through the connecting seat.

5. The electric valve according to the claim 1, wherein, the gear set is a planetary gear set having gears of three or more stages, the planetary gear set is fixedly mounted in the space by cooperation between the gear cover and the valve body, part of the valve stem is located in the space, and rest of the valve stem is located in the valve body.

6. The electric valve according to the claim 5, wherein, the planetary gear set has gears of four stages, a central axis of the first-stage gear coincides with a central axis of the planetary gear set, the first-stage gear is externally engaged with more than two second-stage gears peripherally distributed at intervals, one axial end of each of the second-stage gears is engaged with an internal ring of a third-stage gear, another axial end of each of the second-stage gears is engaged with an internal ring of a fourth-stage gear, and the third-stage gear is fixedly connected to the gear cover.

7. The electric valve according to the claim 6, wherein,
the gear set further comprises a gear fixing seat mounted at the end portion opening, part of the valve stem is extended into the cavity and is connected with the valve core, and another part of the valve stem passes through the gear fixing seat, is extended into the space, and is connected with the planetary gear set; and, the gear fixing seat is provided with a position-limiting post configured to support the gear set and limit rotation of the valve core to be within a range of switching working positions, and the fourth-stage gear is provided with a position-limiting groove cooperating with the position-limiting post.

8. The electric valve according to the claim 1, wherein, the gear set comprises gears of more than four stages, gears of various stages subsequent to the second-stage gear are sequentially distributed in an axial direction and are engaged stage by stage; and in addition to the first-stage gear, each of the gears of various stages has a transmission gear fixed in a respective peripheral direction and located in a same plane as a next stage gear, so as to engage with the next stage gear through the transmission gear;

and the gear set further comprises position-limiting sleeves fitted over the position-limiting posts for limiting axial float of the gears of various stages and the transmission gears.

* * * * *